United States Patent [19]
Fields et al.

[11] Patent Number: 5,767,945
[45] Date of Patent: Jun. 16, 1998

[54] METHODS OF CHANGING THE VISIBILITY OF SOME CHARACTERISTIC OR INFORMATION TO BE INCLUDED IN A HARD COPY OF A RECORDED IMAGE

[75] Inventors: Roger Alan Fields, Pittsford; William Clark Atkinson, Webster, both of N.Y.

[73] Assignee: Eastman Kodak Company, Rochester, N.Y.

[21] Appl. No.: 608,427

[22] Filed: Feb. 28, 1996

[51] Int. Cl.⁶ .................... G03B 27/32; G03B 27/52; G03B 27/72
[52] U.S. Cl. .................. 355/39; 355/35; 355/46; 355/77; 355/112
[58] Field of Search .................. 355/32, 35, 38, 355/39, 40, 41, 42, 43, 77, 67, 70, 68, 69, 71, 112

[56] References Cited

U.S. PATENT DOCUMENTS

| | | |
|---|---|---|
| 4,823,163 | 4/1989 | Rollet et al. .................. 355/41 |
| 4,903,068 | 2/1990 | Shiota . |
| 4,933,773 | 6/1990 | Shiota et al. . |
| 5,153,715 | 10/1992 | Bender et al. . |
| 5,319,402 | 6/1994 | Tsujimoto et al. .................. 354/104 |

FOREIGN PATENT DOCUMENTS 5-27406  2/1993  Japan .................. G03D 15/00

*Primary Examiner*—R. L. Moses
*Assistant Examiner*—Shival Virmani
*Attorney, Agent, or Firm*—Gordon M. Stewart

[57] ABSTRACT

A method of making more visible some characteristic to be included in a hard copy of a recorded image includes reading a variable visible characteristic within a predefined area of the recorded image to determine the visible composition of the variable characteristic. At least one stored variation of the variable characteristic is selected, based on the visible composition of the read variable characteristic, from a plurality of stored variations of the variable characteristic. The selected stored variation of the variable characteristic will have greater visibility within a predefined area of the hard copy, which corresponds to the predefined area of the recorded image, than the variable characteristic within the predefined area of the recorded image. The selected one or more characteristics are included in the predefined area of the hard copy.

21 Claims, 5 Drawing Sheets

METHODS OF CHANGING THE VISIBILITY OF SOME CHARACTERISTIC OR INFORMATION TO BE INCLUDED IN A HARD COPY OF A RECORDED IMAGE

CROSS-REFERENCE TO RELATED APPLICATION

Reference is made to commonly assigned copending application Ser. No. 60/004,542, entitled Index Print With Means for Identifying a Selected Area of at Least One Imagette, and filed in the names Murray et al.

FIELD OF THE INVENTION

The invention relates generally to the field of imaging, and in particular to photography. More specifically, the invention relates to methods of changing the visibility of some characteristic or information to be included in a hard copy of a recorded image.

BACKGROUND OF THE INVENTION

When creating a hard copy of a recorded image of a scene, it is often desirable to include additional information on the hard copy besides the scene information. Sometimes this additional information is overlaid on the scene information. A problem that can occur in this scenario is that if the additional information has similar characteristics (e.g. color, image density) to the scene information onto which it is overlaid, the visibility of the additional information can be substantially reduced. Specific prior art examples of this problem are given below.

Japanese Kokai Patent Application No. HEI 5[1993]-27406, published Feb. 5, 1993, discloses an index print for presenting a plurality of positive images (imagettes) corresponding to images which are recorded on a photographic film. As shown in FIG. 2(A) of the 27406 Kokai, vertical and/or horizontal monochrome lines can be provided on a particular imagette to indicate, for example, that the corresponding image recorded on the film was designated to be printed as a pseudo panoramic, half-frame or telephoto image. Such pseudo image is recorded on the film with a conventional aspect ratio. However, prior to picture taking, the camera operator made a selection on the camera that the image to be recorded should be printed as, for example, a panoramic image. This selection is recorded on the film and is used to inform a photofinisher that the particular image is to be printed in a panoramic format. Such printing can be accomplished by masking the top and bottom portions of the film frame during printing.

A problem with the index print disclosed in the 27406 Kokai is that the monochrome vertical and/or horizontal lines for designating a pseudo image may not be visible in portions of the imagette. For example, if a pair of black horizontal lines are used on an imagette to indicate that the corresponding image on the film was designated as a panoramic image, a large portion or all of the upper black horizontal line may not be visible if the scene in the imagette includes a dark night sky. Such a situation is obviously problematic because an observer of the index print may have difficulty in discerning that a particular image was designated for panoramic, half-frame or telephoto printing.

Other information which can be provided over a scene image is a date that the image is recorded. The date is often provided in a bright orange color in a lower right corner of a photograph. A problem occurs if the scene being recorded is the reflection on water of a sunset with a bright orange color in the lower right corner of the photograph. Obviously, a bright orange date of image recording would be difficult to view when recorded over the bright orange reflection in the scene.

The additional information can also be provided on the back side of the hard copy opposite the scene image. A problem that can occur in this case is that high image density additional information (e.g. black alphanumerics) can bleed through or show through the scene image if this additional information is located opposite a low image density portion of the scene image.

SUMMARY OF THE INVENTION

The present invention is directed to overcoming one or more of the problems set forth above. Briefly summarized, according to a first aspect of the present invention, a method of making more visible some characteristic to be included in a hard copy of a recorded image includes reading a variable visible characteristic within a predefined area of the recorded image to determine the visible composition of the variable characteristic. At least one stored variation of the variable characteristic is selected, based on the visible composition of the read variable characteristic, from a plurality of stored variations of the variable characteristic. The selected stored variation of the variable characteristic will have greater visibility within a predefined area of the hard copy, which corresponds to the predefined area of the recorded image, than the variable characteristic within the predefined area of the recorded image. The selected one or more characteristics are included in the predefined area of the hard copy.

By selecting a stored variation of the variable characteristic that will have greater visibility within the hard copy image, additional information with the selected characteristic provided on the hard copy image will be easier to see. For example, a viewer of an index print will clearly be able to discern that a particular film image, corresponding to an imagette on the index print, was designated for panoramic printing because the pair of horizontal lines on the imagette will be visible regardless of the scene content of the imagette.

According to a second aspect of the present invention, a method of making more visible some characteristic to be included in a hard copy of a recorded image includes reading a variable visible characteristic within the recorded image to determine the visible composition of the variable characteristic. One or more predetermined variations of the variable characteristic are stored. The determined composition of the variable characteristic within the recorded image is evaluated to select an area of the recorded image that will provide greater visibility for the stored one or more variations of the variable characteristic within an area of the hard copy, corresponding to the selected area of the recorded image, than one or more nonselected areas of the recorded image. At least one of the one or more stored variations of the variable characteristic is included in the selected area of the hard copy.

By selecting an area of the recorded image that will provide greater visibility for the stored variation of the variable characteristic, additional information with the stored variation of the variable characteristic provided on the hard copy image will be easier to see. For example, a bright orange date that an image was recorded can be overlaid on a scene in a photograph to have better visibility. Also, it is preferable to select an area at the periphery of the scene instead of the center of the scene to avoid interfering with the typical primary portion of the recorded scene.

According to a third aspect of the present invention, a method of providing information on a back side of a hard copy of a recorded image to substantially minimize any visibility of the information through the hard copy includes reading a variable visible characteristic within one or more predefined areas of the recorded image to determine the visible composition of the variable characteristic. A feature of the information to be recorded on the back side of the hard copy is changed, taking into account the visible composition of the variable characteristic, to substantially minimize any visibility of the information through the hard copy. The information with the changed feature is printed on the back side of the hard copy.

As a result, information, for example in alphanumeric form, can be provided on the back of a photograph without showing through the image on the photograph at some point in the future. The changed feature of the information can include, for example, color, image density and or information location.

According to a fourth aspect of the present invention, a method of changing the visibility of some characteristic to be included in a hard copy of a recorded image of a scene includes reading a variable visible characteristic within the scene to determine the visible composition of the variable characteristic. The determined composition of the variable characteristic within the scene is evaluated to change the visibility of the characteristic to be included in the hard copy of the recorded image of the scene. The characteristic with changed visibility is included in the hard copy of the recorded image of the scene.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
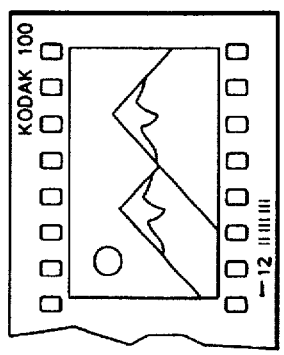
FIG. 1 is a schematic representation of a photographic filmstrip with images exposed thereon.
Figure 1:
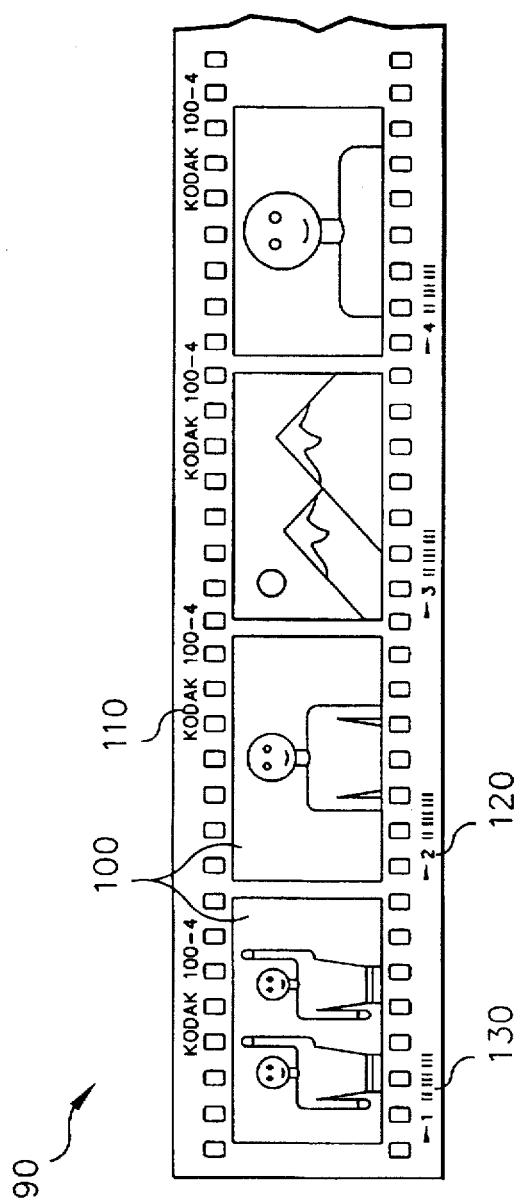

Beginning with FIG. 1, a processed photographic filmstrip 90 (image recording medium) has recorded thereon a plurality of images 100 which were recorded on the filmstrip by a photographic camera in a known manner. Filmstrip 90 also includes a human readable manufacturer's information code 110 adjacent a top edge of the filmstrip and, a human readable frame number 120 and machine readable frame number 130 adjacent a bottom edge of the filmstrip. Filmstrip 90 includes a virtually transparent magnetic recording layer. Various information related to the images on the filmstrip is recorded onto the magnetic layer by a magnetic recording head in the camera.

The information recorded on the magnetic layer can include, for example, a date that an image was recorded on filmstrip 90 and a frame number. The information can also include a designated aspect ratio (e.g. panoramic, approximately 3:1) for printing an image on the filmstrip. Such recording of the designated aspect ratio on a magnetic layer of a photographic filmstrip is disclosed in previously described Japanese Kokai patent Application No. HEI 5[1993]-27406, the disclosure of which is incorporated herein by reference. Alternatively, the designated aspect ratio can be recorded as an optical "fat bit" on film 90 adjacent its associated image or on a companion RAM chip loaded in the camera.

Recording of the designated aspect ratio for an image on the magnetic layer of the filmstrip is useful in a pseudo panoramic and/or telephoto system in which all images are recorded on the film in a full frame format. When a photofinisher processes the filmstrip, the designated aspect ratio is read from the magnetic strip and only part of the image recorded on film 90 is used to create hard copy prints for images designated for other than full frame printing. For example, if an image recorded on the filmstrip is designated for panoramic aspect ratio printing, a top and bottom portion of the filmstrip image will be masked during printing such that a 3 inch by 10 inch (7.62 cm by 25.40 cm) print will be created. Of course, other known printing techniques can be used to achieve the same result.

Figure 2:
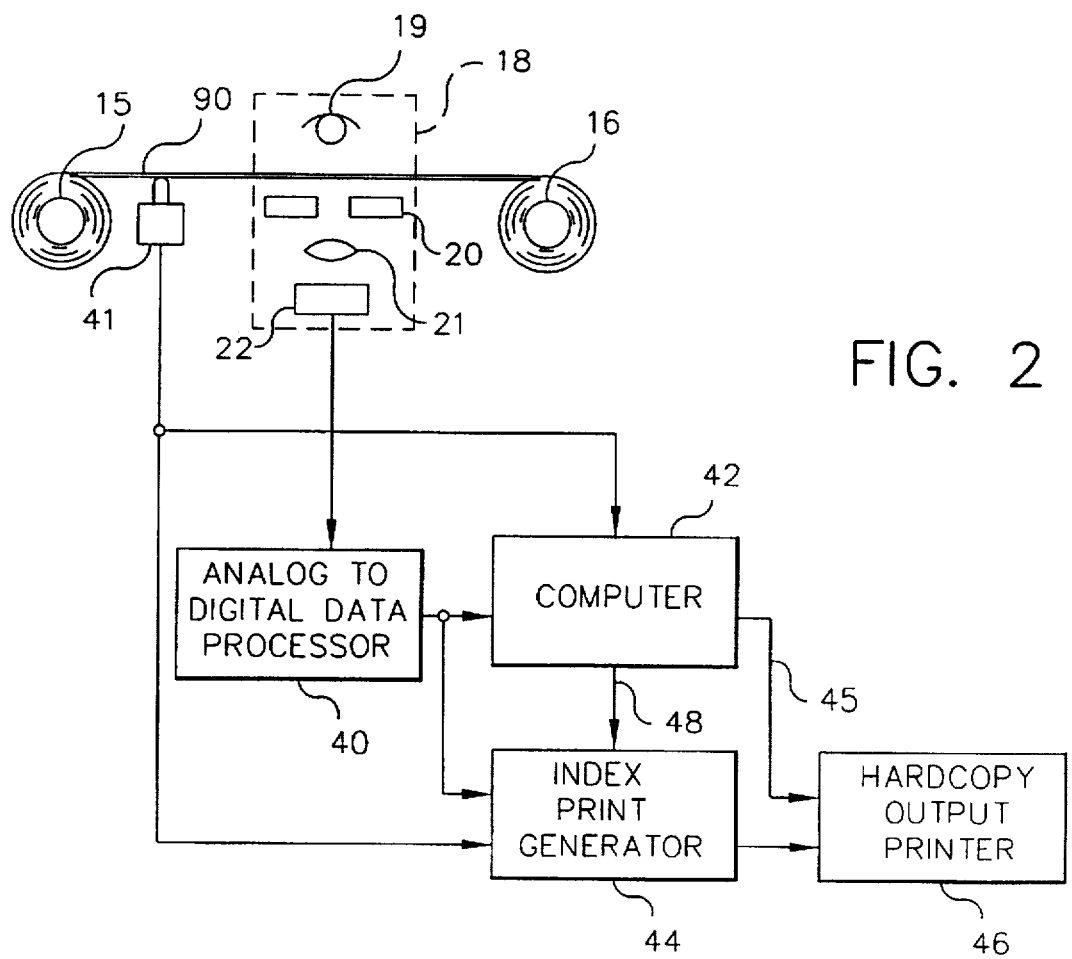
FIG. 2 is a schematic representation of an apparatus for making prints and index prints from the filmstrip of FIG. 1.

Turning to FIG. 2, an apparatus for producing prints and index prints from filmstrip 90 is shown. In the illustrated apparatus, processed photographic filmstrip 90 is advanced by transport means (not shown) from a supply reel 15 through a film scanner (reader) 18 to a take-up reel 16. Scanner 18 is typically provided with a light source 19 to shine light through a film frame on film 90 positioned in a frame gate 20. The resultant image light is focused by a lens 21 onto a scanning image sensor 22 which may take the form of any of a variety of known scanning devices such as a linear or two dimensional area array charge coupled device (CCD).

Although scanner 18 is shown with optical focusing of the film image onto sensor 22, it will be appreciated that scanner 18 may employ virtual contact of the type disclosed in commonly assigned U.S. Pat. No. 5,153,715 entitled COLOR FILM SCANNING APPARATUS, the disclosure of which is incorporated herein by reference. With a virtual contact scanner, optical focusing lens 21 is eliminated and scanner 22 preferably comprises a tri-linear CCD device which is placed closely adjacent the underside of film 90. In this arrangement, scanning sensor 22 comprises a 480 element by 3 line color linear CCD imager with each line being provided with a color filter (e.g. red, green and blue) to be individually responsive to separate colors in the image. In operation, the sensor images a predetermined film width, such as a 35 mm format negative, with the film motion providing the page or lengthwise scan of the film frame image. Thus, image data, including image density and color, is generated in a 480V by 252H (vertical by horizontal) format.

The output of sensor 22, in a scanned pixel analog signal form, is applied to an analog-to-digital data processor 40 to be converted in known manner into digital values representative of the analog pixel information received from scanner sensor 22. The digital values are forwarded to both a computer 42 and a known index print generator 44. Operation of computer 42, to be described, can readily be achieved by one having ordinary skill in software implementation. Assuming the system utilizes eight bits per pixel for each of the three colors from the scanner, 256 color levels can be resolved for each color in each pixel.

A magnetic read/write head 41 is adapted to read information recorded on the magnetic layer on filmstrip 90. The information read by magnetic head 41 is passed to index print generator 44 and computer 42. This information can include for each film frame, as described above, a date the image was recorded on the film, a frame number and a designated aspect ratio for printing (e.g. panoramic). Magnetic head 41 inputs frame counts to index print generator 44 to keep track of the accumulated number of film frames stored in generator 44 and also to correlate the frame numbers to the individual images in the index print matrix.

Computer 42 utilizes the aspect ratio designation for a particular image to determine how much of the stored image data for that image should be output from the computer along a path 45 to a hard copy printer 46 for generating a print. For example, if a particular image is designated for full frame printing, computer 42 will transmit all of the image data for that image to printer 46. However, if a particular image is designated for panoramic printing, computer 42 will transmit only the image data for a middle horizontal section of that image to printer 46. Computer 42 also transmits a date that the image was recorded on filmstrip 90 to printer 46.

The image data from computer 42 is adjusted for color and/or density corrections using exposure correction data applied by computer 42 to printer 46. Hard copy printer 46 may be any well known form of color printer, depending on the nature of the prints being produced. Examples of suitable printers would be a thermal dye printer, inkjet printer, laser printer, electrophotostatic printer or the like. A resulting panoramic print created by printer 46 is disclosed in FIGS. 4 and 5 (described in further detail below).

At index print generator 44, the digital data is processed and stored as a matrix of film frame image signals suitable for use in producing an index print. Computer 42 controls operation of index print generator 44. In a preferred form, index print generator 44 is adapted to process this data in several modes, depending upon the specific requirement of an output printer system 46. For example, the image data from A/D data processor 40 can be processed and stored in generator 44 in full 480V by 252H resolution for high quality index prints. Alternatively, the data can be buffered (stored) in, for example, a 160V by 252H resolution for medium quality index prints or in 24V by 36H resolution for lower quality index prints, all depending on the output printer system image resolution printing characteristics.

Index print generator 40 uses the aspect ratio designations read by magnetic head 41 to alter the matrix of film frame image signals in order to provide a visible aspect ratio indicator (e.g. horizontal and/or vertical lines) for non-full frame images on the corresponding index print imagettes. Suitable examples of arrangements for producing an index print matrix from scanned image data are described in U.S. Pat. Nos. 4,903,068 and 4,933,773, the disclosures of which are incorporated herein by reference.

When a predetermined number of filmstrip images are accumulated in index print generator 44, the stored image data is then output to hard copy printer 46 for generating the desired index print. The scanned film frame image signals used to generate the index print signal data may be applied directly to output printer 46 without any exposure correction or they may be adjusted for color and/or density corrections using exposure correction data applied on line 48 from computer 42 to the index print generator 44. Computer 42 operates in a well known manner to determine the correct exposure or digital printing values for printing the index print. In the latter case, the appearance of the index prints is improved to correspond to the appearance of the associated prints.

Figure 3:
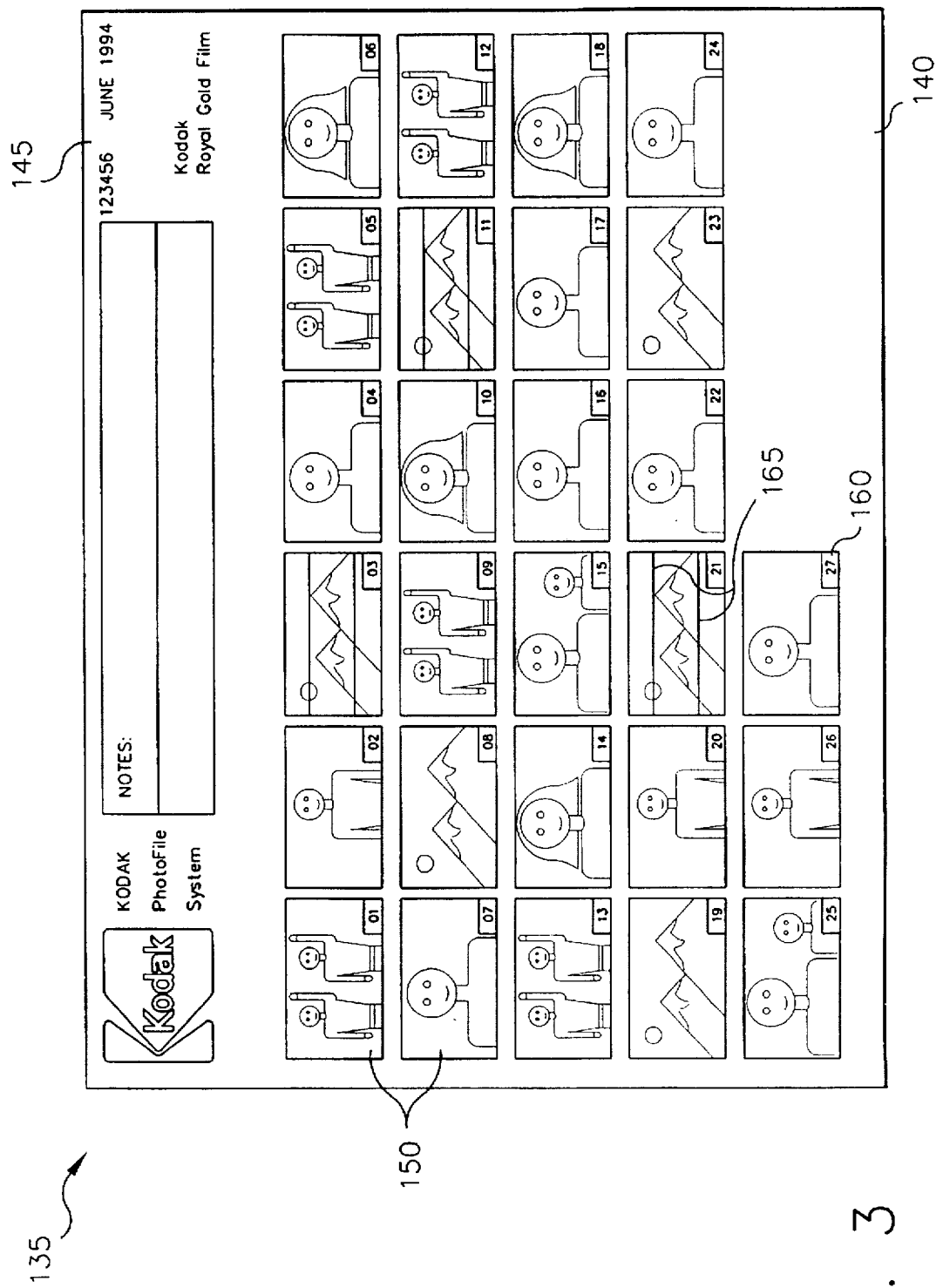
FIG. 3 is an index print created by the apparatus of FIG. 2.

Referring to FIG. 3, a representative index print 135, created by printer 46, is shown as comprising a matrix of small-sized positive imagettes 150 printed on a recording sheet 140. A data section 145 of the index print includes a filmstrip identification number, a date that the index print was created and a filmstrip type. The positive imagettes on the index print correspond to a predetermined series of image frames (27 in this example) on filmstrip 90. If there are 36 images recorded on filmstrip 90, two index prints may be needed to display all of the images. Each of the index print imagettes preferably bears an image frame number 160 that correlates the particular imagette on the index print to the corresponding frame image on filmstrip 90. Thus, a customer can easily determine the content of a filmstrip without the need to physically view the filmstrip. This is of course particularly useful when reordering prints from a photofinisher.

All positive imagettes 150 on the index print are recorded as full-frame images regardless of their designated aspect ratios. However, for positive imagettes 3, 11 and 21, which have a panoramic designated aspect ratio, a pair of horizontal lines 165 are provided on each positive imagette. The horizontal lines indicate the designated aspect ratio for printing corresponding prints. As such, the prints corresponding to imagettes 3, 11 and 21 will only include the image information between horizontal lines 165 for each print.

As mentioned in the previous "BACKGROUND OF THE INVENTION", a problem in the prior art is that a part or all of horizontal lines 165 may not be visible because they get lost in the image information of the imagette. For example, in imagette 21, if the recorded mountain scene includes a night sky and horizontal lines 165 are black, a large portion of the upper horizontal line will not be visible. The invention solves this problem as follows.

Assuming each horizontal line 165 will be two pixels wide in the imagette, computer 42 (FIG. 2) analyzes a variable visible characteristic of the image content in a predefined four pixel wide horizontal slice of the imagette that will contain a horizontal line 165. A preferred characteristic that the computer analyzes is color content. Computer 42 analyzes the color content of the four pixel wide horizontal slice of the imagette, and then selects a color from a plurality of stored colors for horizontal line 165, based on the overall color content of the four pixel wide horizontal slice of the imagette, which will enhance the visibility of the horizontal line in the imagette. In essence, computer 42 changes the color of the pixels where the horizontal line is to be located in order to create a visible horizontal line.

More specifically, if computer 42 determines that the four pixel wide horizontal slice of the imagette is predominantly red in color, the computer will cause the horizontal line created in this slice to be cyan in color because cyan is the complimentary color of red. A cyan horizontal line will be clearly visible on a red background. If the imagette slice is mostly green in color, computer 42 will cause the horizontal line to be colored magenta which is green's complimentary color. If the imagette slice is mostly blue in color, computer 42 will cause the horizontal line to be colored yellow which is blue's complimentary color.

The four pixel wide horizontal slice of the imagette may have two predominant colors such as red and green, in which case computer 42 would cause the horizontal line to be colored blue. If the two predominant colors in the imagette slice are green and blue, computer 42 would cause the horizontal line to be colored red. Further, if the two predominant colors in the imagette slice are red and blue, computer 42 would cause the horizontal line to be colored green.

A third scenario which can occur is that the four pixel wide horizontal slice of the imagette contains about equal amounts of red, green and blue. In this case the imagette slice is probably white, black or gray in color. The image density (brightness) characteristic of the horizontal slice is checked in this situation to determine what color to make horizontal line 165. In an 8-bit system, a level of 256 for each of the red, blue and green colors indicates that the imagette slice is white. In this situation, computer 42 causes the horizontal line to be colored black. If the level of color is 0 for each of the red, blue and green colors, the imagette slice is black in color. As such, a white horizontal line will be used in the imagette. A level of 127 for each of the red, green and blue colors indicates a mid-level gray color. Consequently, the computer can cause horizontal line 165 to be either black or white in color.

As a result, horizontal lines 165 in imagettes 3, 11 and 21 should remain visible regardless of the scene content (color and image density) in these imagettes. The two horizontal lines in each pair may be colored differently from each other (or may be multi-colored within each line) due to different scene content adjacent each respective horizontal line. Vertical lines can also be created on an imagette to represent a half-frame image, or, in conjunction with a pair of horizontal lines, to show a pseudo-telephoto or other aspect ratio designation. Image density alone can be used to enhance the visibility of horizontal lines 165. For example, if the four pixel wide horizontal slice of the imagette was saturated red in color (a 256 level), the horizontal line for designating a panoramic aspect ration could be a 50 level red which would appear pink in the imagette. The pink horizontal line will be visible against the saturated red background. Other variable visible characteristics which can be used to enhance the visibility of the horizontal lines are sharpness and graininess.

Figure 4:
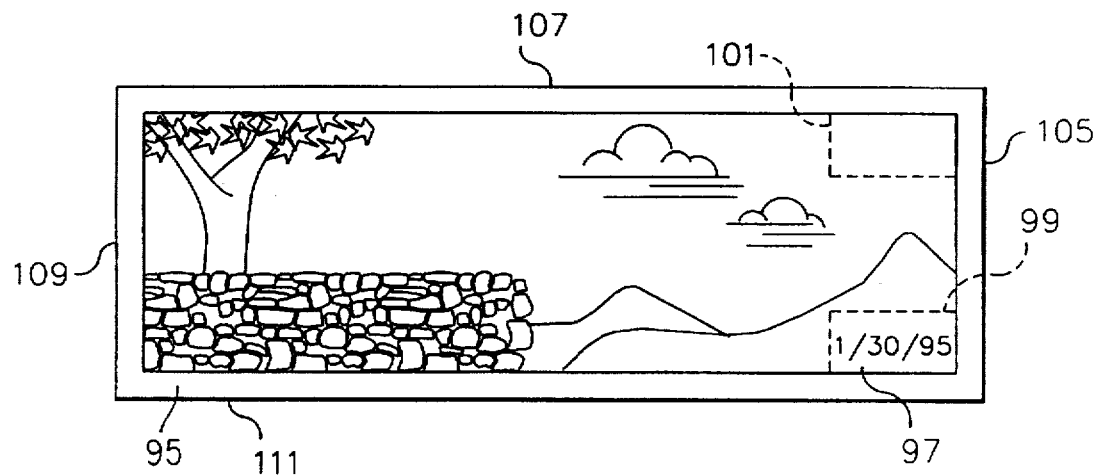
FIGS. 4 and 5 are prints created by the apparatus of FIG. 2.

Turning to FIG. 4, the method of enhancing the visibility of horizontal lines 165 described above can also be used to enhance the visibility of a date 97 provided on a print 95. Prior to transmitting image data to printer 46, computer 46 analyzes the color content within a dotted line area 99 of the image data to be transmitted to the printer. Based on the color content within dotted line area 99, computer 42 assigns a color to date 97 to enhance the visibility of the date in the print. For example, if the mountain portion of the scene in print 95 is predominantly green in color, computer 42 will cause date 97 to be magenta to enhance the visibility of date 97.

Figure 5:
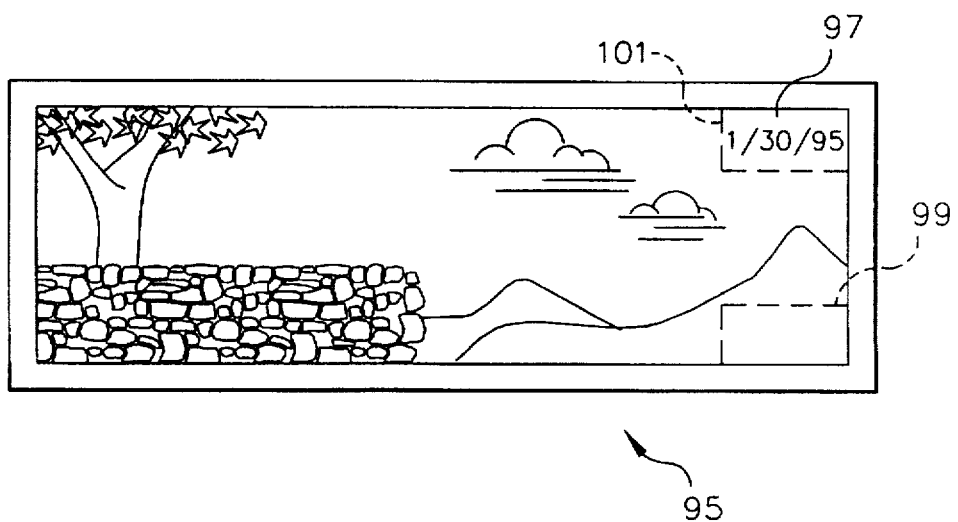

With reference to FIGS. 4 and 5, an alternative embodiment of the invention will be described. In this embodiment, date 97 is a fixed color, say blue, and the intent is to use a blue date in all prints created.. Prior to transmitting image data to printer 46, computer 46 analyzes the color content within dotted line areas 99 and 101 of the image data to be transmitted to the printer. Based on the color content within dotted line areas 99 and 101, computer 42 selects one of the two dotted line areas 99, 101 within which to place date 97 to enhance the visibility of the date in the print. For example, if the mountain portion of the scene in dotted line area 99 is predominantly green in color and the sky portion of the scene in dotted line area 101 is predominantly blue in color, computer 42 will cause blue date 97 to be placed within dotted line area 99 to enhance the visibility of date 97.

FIG. 5 discloses a print in which date 97 is green in color. Computer 42 has placed the date within dotted line area 101 which is predominantly blue in color to enhance the visibility of date 97. Computer 42 did not select dotted line area 99 because green date 97 would have poor visibility against the green mountain portion of the scene. Of course, computer 42 can analyze more than two areas of the scene image to be printed in selecting a location for placing date 97 within the print. Also, computer 42 can store more than one date color in a look-up table to accommodate a situation where the image to be printed is entirely the same color as the primary color for the date to be printed within the scene. For example, if the primary color for date 97 is blue, and the scene to be printed is entirely a blue sky, computer 42, after analyzing this scene will select a secondary stored color such as yellow for date 97.

Figure 6:
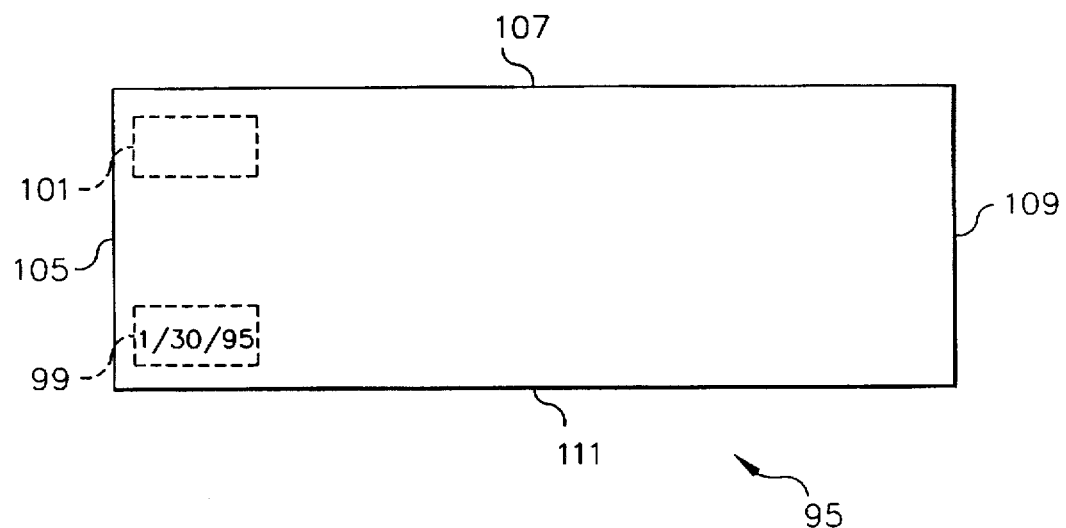
FIGS. 6 and 7 are the back sides of the prints shown in FIGS. 4 and 5.

Turning to FIG. 6, a still further embodiment of the invention will be described. A back side 103 of panoramic print 95 includes sides 105, 107, 109 and 111. Sides 105, 107, 109 and 111 are shown in FIG. 4 also, and are provided to facilitate understanding of the orientation of the back side of print 95. In this embodiment, printer 46 (FIG. 2) includes a backprinter, such as an inkjet printer, for backprinting information on the back side of print 95. Computer 42 analyzes a variable visible characteristic (e.g. color, density) of the image data to be transmitted to printer 46, and then changes a feature of the information to be backprinted on print 95 in order to substantially minimize any visibility of the information through the print.

More specifically, assuming printer 46 includes a black and white backprinter which prints black alphanumerics on the back of print 95, computer 46 will locate that portion of the image data having the highest image density (i.e. the darkest location) and then will cause the backprinter to print the black alphanumerics on the back side of print 95 opposite the high image density portion. For example, in FIG. 4, computer 42 analyzes the image data and determines that the image within dotted line portion 99 is dark green in color and density (a mountain). Computer 42 also determines that the image within dotted line portion 101 is light blue in color and density (sky). Computer 42 would thus instruct the backprinter to print a black date that the image was recorded within dotted line portion 99 on the back of print 95 rather than within dotted line portion 101. This is because a black date is less likely to show through a dark green portion of print 95 than a light blue portion of the print.

Although only two portions 99, 101 of the image are analyzed by computer 42 in this example, many more portions of the image or the entire image can be analyzed to locate the highest image density location of the image. Then, backprinting is accomplished opposite this highest image density location. Backprinting can be accomplished in different locations on the back of print 95 by selectively actuating that portion of the backprinter adjacent the desired location of backprinting.

Figure 7:
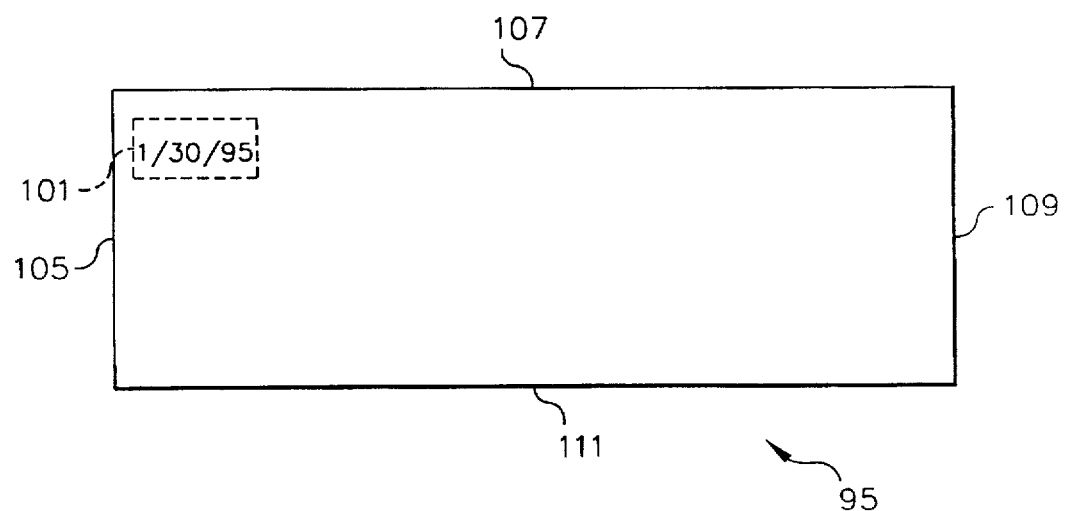

Alternatively, if a full color backprinter is utilized, backprinting is accomplished in the same relative location on the back of every print. However, the color and density of the backprinted information is changed with each print to match the image color and density opposite the backprinted information. For example, in FIG. 7, the date "Jan. 30, 1995" has been backprinted in dotted line portion 101. Because dotted line portion 101 contains light blue sky in the image portion, computer 42 causes the color backprinter to print the date "Jan. 30, 1995" in a light blue color. Consequently, the light blue date "Jan. 30, 1995" will not be visible through the print even if there is some bleeding of the ink through the paper on which the print is created.

Figure 8:
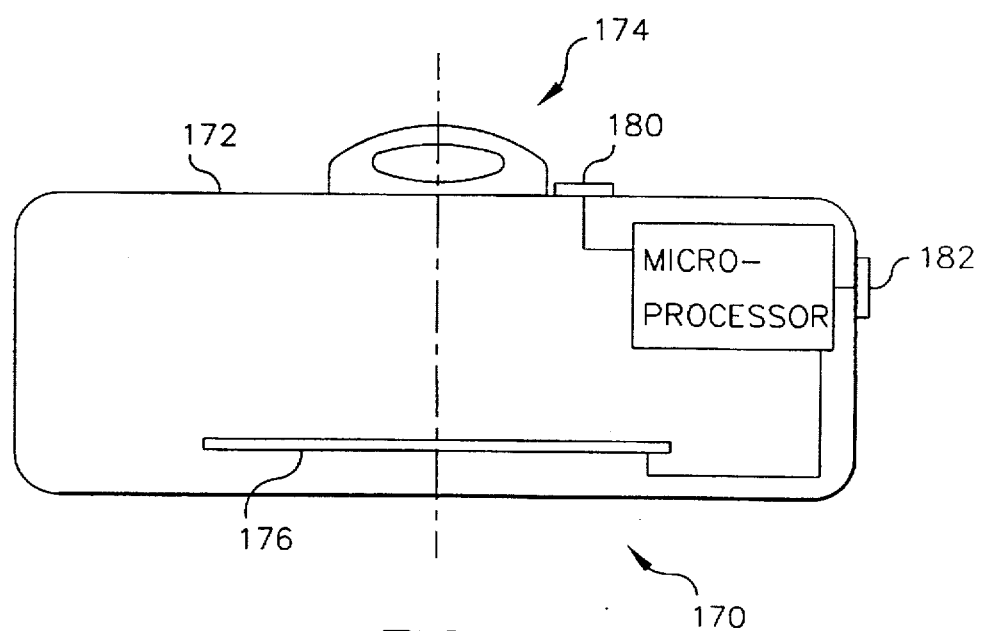
FIG. 8 is a top schematic sectional view of an electronic camera.

A still further embodiment of the invention is described with reference to FIGS. 2 and 8. An electronic camera 170 includes a camera body 172 and an objective lens 174. An electronic image capture element 176, such as a two-dimensional array of charge-coupled-devices, electronically records an image of a scene passing through objective lens 174. A microprocessor 178 controls operation of electronic image capture element 176 and includes a memory section for storing images captured by the element 176. A manually operable switch 180 enables a camera operator to select a designated aspect ratio for printing images captured by camera 170. Finally, an information exchange port 182 allows images captured by the camera and information related to these images, such as designated printing aspect ratio, date of image recording and frame number, to be downloaded to computer 42 and index print generator 44 (FIG. 2).

In this embodiment of the invention, scanner 18 (FIG. 2) is completely eliminated, because the image data is already in electronic form when recorded by the camera. The camera operator downloads the image data and information related to the images via port 182 into computer 42 and index print generator 44 (the image data and related information has been digitized in the camera). The remainder of the process, as described in all of the embodiments described above, remains the same. The main difference in this embodiment is that the image data and related information is provided to computer 42 and index printer 44 directly from camera 170 rather than scanner 18, magnetic head 41 and processor 40. The variable visible characteristic (e.g. color, image density) is read from the scene itself, rather than filmstrip 90, to determine the visible composition of the variable characteristic.

The invention has been described with reference to a preferred embodiment. However, it will be appreciated that variations and modifications can be effected by a person of ordinary skill in the art without departing from the scope of the invention. For example, instead of digitally printing the photographs, the photographs can be optically printed in a known manner.

PARTS LIST

15 Supply Reel
16 Take-up Reel
18 Film Scanner
19 Light Source
20 Frame Gate
21 Lens
22 Scanning Image Sensor
40 A to D Data Processor
41 Magnetic Head
42 Computer
44 Index Print Generator
45 Path
46 Hard Copy Printer
48 Line
90 Filmstrip
95 Print
97 Date
99, 101 Dotted Line Areas
100 Images
103 Back Side of Print
105, 107, 109, 111 Sides of Print
110 Code
120 Human Readable Frame Number
130 Machine Readable Frame Number
135 Index Print
140 Recording Sheet
150 Imagettes
160 Frame Number
165 Horizontal Lines
170 Electronic Camera
172 Camera Body
174 Objective Lens
176 Electronic Image Capture Element
178 Microprocessor
180 Switch
182 Information Exchange Port

We claim:

1. A method of making more visible some characteristic to be included in a hard copy of a recorded image, comprising the steps of:
    reading a variable visible characteristic within a predefined area of the recorded image to determine the visible composition of the variable characteristic;
    selecting from a plurality of stored variations of the variable characteristic, based on the visible composition of the read variable characteristic, at least one that will have greater visibility within a predefined area of the hard copy, which corresponds to the predefined area of the recorded image, than the variable characteristic within the predefined area of the recorded image; and
    including the selected one or more characteristics in the predefined area of the hard copy.

2. The method of claim 1, wherein the variable characteristic to be read within the predefined area of the recorded image is color content of the predefined area, and wherein the stored variations of the variable characteristic are individual colors.

3. The method of claim 1, wherein the variable characteristic to be read within the predefined area of the recorded image is brightness content of the predefined area, and wherein the stored variations of the variable characteristic are different levels of brightness.

4. The method of claim 1, wherein the predetermined area of the hard copy is part of an index print having a plurality of images.

5. The method of claim 4, wherein the including step is effective to create one or more visible horizontal and/or vertical lines in the predefined area of the hard copy for indicating a designated portion of the recorded image to be printed.

6. The method of claim 1, wherein the hard copy is a print and the including step is effective to create a visible date in the predefined area of the hard copy that the recorded image was captured.

7. The method of claim 1, further comprising the step of:
    identifying, prior to the reading step, which predefined area of the recorded image is to be read for the variable characteristic.

8. The method of claim 1, wherein the reading step reads the same predefined area for each recorded image.

9. A hard copy made according to the method of claim 1.

10. The method of claim 1, wherein the variable characteristic to be read within the predefined area of the recorded image is selected from the group consisting of color, density, sharpness and granularity.

11. A method of making more visible some characteristic to be included in a hard copy of a recorded image, comprising the steps of:
    reading a variable visible characteristic within the recorded image to determine the visible composition of the variable characteristic;

storing one or more predetermined variations of the variable characteristic;

evaluating the determined composition of the variable characteristic within the recorded image to select an area of the recorded image that will provide greater visibility for the stored one or more variations of the variable characteristic within an area of the hard copy, corresponding to the selected area of the recorded image, than one or more nonselected areas of the recorded image; and including at least one of the one or more stored variations of the variable characteristic in the selected area of the hard copy.

12. The method of claim 11, wherein the read characteristic is color make-up of the of the recorded image, and wherein the predetermined variation of the variable characteristic is a color.

13. The method of claim 12, wherein the predetermined color variation is stored in a look-up table.

14. The method of claim 12, wherein the including step provides a stored variation of the variable characteristic having the same color for each hard copy image created.

15. The method of claim 11, wherein the hard copy is a print and the including step is effective to create a visible date in the selected area of the hard copy that the recorded image was captured.

16. A hard copy created according to the method of claim 11.

17. A method of providing information on a back side of a hard copy of a recorded image to substantially minimize any visibility of the information through the hard copy, comprising the steps of:

reading a variable visible characteristic within one or more predefined areas of the recorded image to determine the visible composition of the variable characteristic;

changing a feature of the information to be recorded on the back side of the hard copy, taking into account the visible composition of the variable characteristic, to substantially minimize any visibility of the information through the hard copy; and printing the information with the changed feature on the back side of the hard copy.

18. The method of claim 17, wherein said reading step reads an image density of the recorded image in a plurality of predefined areas of the recorded image, wherein said changing step changes the location of where said information will be printed on the back side of the hard copy so that the information will be printed opposite a predefined area of the recorded image having a higher image density than another predefined area of the recorded image, and wherein the printing step prints the information on the back side of the hard copy opposite the predefined area having the higher image density.

19. The method of claim 17, wherein said reading step reads a color of the recorded image in a predefined area of the recorded image, wherein said changing step changes a color of the information to be recorded on the back side of the hard copy to be similar to the color of the predefined area of the recorded image to reduce visibility of the information through the hard copy, and wherein the printing step prints the information with adjusted color on the back side of the hard copy opposite the predefined area of the recorded image.

20. The method of claim 17, wherein the read characteristic is selected from the group consisting of color, sharpness and granularity.

21. A method of changing the visibility of some characteristic to be included in a hard copy of a recorded image of a scene, comprising the steps of:

reading a variable visible characteristic within the scene to determine the visible composition of the variable characteristic;

evaluating the determined composition of the variable characteristic within the scene to change the visibility of the characteristic to be included in the hard copy of the recorded image of the scene; and including the characteristic with changed visibility in the hard copy of the recorded image of the scene.

* * * * *